United States Patent
Sunada et al.

(10) Patent No.: US 11,390,729 B2
(45) Date of Patent: Jul. 19, 2022

(54) RUBBER COMPOSITION, VULCANIZED RUBBER, AND MOLDED ARTICLE OF SAID VULCANIZED RUBBER

(71) Applicant: DENKA COMPANY LIMITED, Tokyo (JP)

(72) Inventors: Takashi Sunada, Itoigawa (JP); Hiroyuki Ishiguro, Itoigawa (JP); Yasushi Abe, Itoigawa (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 17/261,960

(22) PCT Filed: Jul. 11, 2019

(86) PCT No.: PCT/JP2019/027471
§ 371 (c)(1),
(2) Date: Jan. 21, 2021

(87) PCT Pub. No.: WO2020/022082
PCT Pub. Date: Jan. 30, 2020

(65) Prior Publication Data
US 2021/0292524 A1    Sep. 23, 2021

(30) Foreign Application Priority Data
Jul. 25, 2018 (JP) .............................. JP2018-139662

(51) Int. Cl.
*C08L 11/02* (2006.01)
*C08L 33/20* (2006.01)

(52) U.S. Cl.
CPC ............... *C08L 11/02* (2013.01); *C08L 33/20* (2013.01); *C08L 2201/08* (2013.01); *C08L 2203/18* (2013.01); *C08L 2205/025* (2013.01)

(58) Field of Classification Search
CPC ...... C08L 11/02; C08L 33/20; C08L 2201/08; C08L 2203/18; C08L 2205/025
See application file for complete search history.

(56) References Cited

FOREIGN PATENT DOCUMENTS

| | | | |
|---|---|---|---|
| EP | 1205499 | A2 | 5/2002 |
| EP | 3124512 | A1 | 2/2017 |
| JP | S55-023153 | A | 2/1980 |
| JP | 56-38336 | A * | 4/1981 |
| JP | S56-038336 | A | 4/1981 |
| JP | 2000-199181 | A | 7/2000 |
| JP | 2001-316525 | A | 11/2001 |
| JP | 2008-195870 | A * | 8/2008 |
| JP | 2015-124354 | A | 7/2015 |
| JP | 2016-011387 | A | 1/2016 |
| JP | 2016-023257 | A | 2/2016 |
| JP | 2017-137414 | A | 8/2017 |
| JP | 2017-141369 | A | 8/2017 |
| JP | 2017-207106 | A | 11/2017 |

OTHER PUBLICATIONS

Japan Patent Office, International Search Report in International Application No. PCT/JP2019/027471 (dated Sep. 17, 2019).
European Patent Office, Extended European Search Report in European Patent Application No. 19840483.2 (dated Jun. 24, 2021).
Japan Patent Office, Written Opinion of the International Searching Authority in International Application No. PCT/JP2019/027471 (dated Sep. 17, 2019).
The International Bureau of WIPO, International Preliminary Report on Patentability in International Application No. PCT/JP2019/027471 (dated Feb. 4, 2021).

* cited by examiner

*Primary Examiner* — Robert D Harlan
(74) *Attorney, Agent, or Firm* — Leydig, Voit & Mayer, Ltd.

(57) ABSTRACT

A rubber composition from which a vulcanized rubber simultaneously improved in three characteristics of oil resistance, cold resistance and ozone resistance can be obtained, and a molded article using the vulcanized rubber are provided. The rubber composition contains 50 to 99 parts by mass of a chloroprene rubber containing 0.01 to 20% by mass of an unsaturated nitrile monomer unit and 1 to 50 parts by mass of a non-conjugated diene rubber.

5 Claims, No Drawings

RUBBER COMPOSITION, VULCANIZED RUBBER, AND MOLDED ARTICLE OF SAID VULCANIZED RUBBER

CROSS-REFERENCE TO RELATED APPLICATIONS

This patent application is the U.S. national phase of International Application No. PCT/JP2019/027471, filed on Jul. 11, 2019, which claims the benefit of Japanese Patent Application No. 2018-139662, filed Jul. 25, 2018, the disclosures of which are incorporated herein by reference in their entireties for all purposes.

TECHNICAL FIELD

The present invention relates to a rubber composition from which a vulcanized rubber excellent in oil resistance, cold resistance and ozone resistance can be obtained, the vulcanized rubber, and a molded article of the vulcanized rubber. The vulcanized rubber obtained from the rubber composition of the present invention can be suitably used as a molded article such as a rubber member for an automobile, a hose and a rubber mold.

BACKGROUND ART

Chloroprene rubber is excellent in mechanical properties, weather resistance, flame retardancy, and the like, and is widely used as a material for industrial rubber parts. The performance requirements for such industrial rubber parts have been remarkably increased, and there is a demand for rubber parts which are excellent in oil resistance, cold resistance and ozone resistance while maintaining properties such as mechanical properties, weather resistance and flame retardancy.

As means for improving the ozone resistance of chloroprene rubber, a technique of blending ethylene-α-olefin rubber and polyester polyol into chloroprene rubber (for example, see Patent Document 1), a technique of blending process oil having a specific kinematic viscosity into chloroprene rubber (for example, see Patent Document 2), and the like are known.

As a means for improving the cold resistance of chloroprene rubber, a technique of blending high styrene rubber and a plasticizer having a specific freezing point and solubility parameter with chloroprene rubber (for example, see Patent Document 3), a technique of blending chloroprene rubber, butadiene rubber, and natural rubber at the specific ratio (for example, see Patent Document 4), and the like are known.

As a means for improving the oil resistance of chloroprene rubber, a technique of blending the specific carbon black and at least one filler selected from the group consisting of a silica and a metal hydroxide compound with chloroprene rubber (for example, see Patent Document) 5), and the like are known.

CITATION LIST

Patent Literature

Patent Document 1: Japanese Unexamined Patent Publication No. 2017-137414
Patent Document 2: Japanese Unexamined Patent Publication No. 2016-023257
Patent Document 3: Japanese Unexamined Patent Publication No. 2016-011387
Patent Document 4: Japanese Unexamined Patent Publication No. 2015-424354
Patent Document 5: Japanese Unexamined Patent Publication No. 2017-207106

SUMMARY OF INVENTION

Technical Problem

In these techniques, the effect of improving each of the properties is sufficient, but it is insufficient to simultaneously improve three properties of oil resistance, cold resistance and ozone resistance.

Therefore, a main object of the present invention is to provide a rubber composition from which a vulcanized rubber simultaneously improved in three characteristics of oil resistance, cold resistance and ozone resistance can be obtained.

Solution to Problem

The present invention provides a rubber composition containing 50 to 99 parts by mass of a chloroprene rubber containing 0.01 to 20% by mass of an unsaturated nitrile monomer unit, and 1 to 50 parts by mass of a non-conjugated diene rubber.

The chloroprene rubber may contain a rubber A and a rubber B, the rubber A may contain 1 to 40% by mass of an unsaturated nitrile monomer unit, 40 to 99% by mass of a chloroprene monomer unit, and 0 to 20% by mass of another copolymerizable monomer unit, and the rubber B may contain 80 to 100% by mass of a chloroprene monomer unit and 0 to 20% by mass of another copolymerizable monomer unit.

The chloroprene rubber may contain 1 to 49 parts by mass of the rubber A and 50 to 98 parts by mass of the rubber B.

The non-conjugated diene rubber may be at least one selected from the group consisting of ethylene-α-olefin copolymer rubber, ethylene-α-olefin-non-conjugated-polyene copolymer rubber, hydrogenated nitrile rubber, acrylic rubber, silicone rubber, and butyl rubber.

The present invention also provides a vulcanized rubber of the rubber composition.

The present invention also provides a molded article using the vulcanized rubber.

Advantageous Effects of Invention

According to the present invention, a rubber composition from which a vulcanized rubber simultaneously improved in three characteristics of oil resistance, cold resistance and ozone resistance can be obtained. Further, a molded article such as a rubber member for an automobile, a hose and a rubber mold using the vulcanized rubber is obtained.

DESCRIPTION OF EMBODIMENTS

A rubber composition according to an embodiment of the present invention contains 50 to 99 parts by mass of a chloroprene rubber containing 0.01 to 20% by mass of an unsaturated nitrile monomer unit, and 1 to 50 parts by mass of a non-conjugated diene rubber.

<Chloroprene Rubber>

The chloroprene rubber is obtained by copolymerizing a chloroprene monomer and an unsaturated nitrile monomer, and contains 0.01 to 20% by mass of an unsaturated nitrile monomer unit in its main chain.

Examples of the unsaturated nitrile monomer include acrylonitrile, methacrylonitrile, ethacrylonitrile, and phenylacrylonitrile, and these compounds can be used alone or in combination of two or more. Among these, acrylonitrile is preferable from the viewpoint of ease of production and oil resistance.

The content of the unsaturated nitrile monomer unit in the chloroprene rubber is 0.01 to 20% by mass, preferably 0.5 to 16% by mass, and more preferably 1 to 12% by mass, with respect to the total amount of the chloroprene rubber. When the content of the unsaturated nitrile monomer unit is less than 0.01% by mass, the oil resistance of the resulting vulcanizate is not improved, and when it exceeds 20% by mass, the cold resistance of the resulting vulcanizate is not improved.

The content of the unsaturated nitrile monomer unit contained in the chloroprene rubber can be calculated from the content of nitrogen atom in the chloroprene rubber. Specifically, the content of nitrogen atom in 100 mg of the chloroprene rubber is measured using an elemental analyzer (SUMIGRAPH 220F, manufactured by Sumika Chemical Analysis Service, Ltd.), and the content of the unsaturated nitrile monomer unit is calculated. The measurement conditions of the elemental analyzer are as follows. The temperatures of the electric furnace are 900° C. in the reaction furnace and 600° C. in the reduction furnace, the temperature of the column is 70° C., and the temperature of the detector is 100° C., and 0.2 ml/min of oxygen as a combustion gas and 80 ml/min of helium as a carrier gas are flowed. A calibration curve is prepared using aspartic acid (10.52%) having a known nitrogen content as a standard substance.

The polymerization method of the chloroprene rubber is not particularly limited, but radical polymerization is preferable. Examples of the radical polymerization include solution polymerization, hulk polymerization, emulsion polymerization, and suspension polymerization, and among these, emulsion polymerization is preferable.

Since the reaction rate of the chloroprene monomer is higher than that of the unsaturated nitrile monomer, the chloroprene monomer is consumed faster than the unsaturated nitrile monomer in the polymerization system. When the ratio of the chloroprene monomer to the unsaturated nitrile monomer is biased, the oil resistance of the produced chloroprene rubber may be lowered. Therefore, when the chloroprene monomer and the unsaturated nitrile monomer are copolymerized, it is preferable to appropriately adjust the amount of the chloroprene monomer in the polymerization system so that the ratio of the unreacted chloroprene monomer to the unsaturated nitrile monomer in the polymerization system is constant. In particular, it is preferable to add the chloroprene monomer reduced by the polymerization reaction into the polymerization system by continuous addition or intermittent 10 or more additions.

The mass ratio of the unreacted chloroprene monomer to the unsaturated nitrile monomer (unreacted chloroprene monomer/unreacted unsaturated nitrile monomer) in the polymerization system is preferably 3/97 to 97/3 from the viewpoint of improving the properties of the obtained chloroprene rubber.

The polymerization initiator used in the emulsion polymerization is not particularly limited, and a known polymerization initiator generally used in emulsion polymerization of a chloroprene monomer can be used. Examples of the polymerization initiator include organic peroxides such as potassium persulfate, ammonium persulfate, sodium persulfate, hydrogen peroxide, and t-butyl hydroperoxide.

The emulsifier used in the emulsion polymerization is not particularly limited, and a known emulsifier generally used in the emulsion polymerization of a chloroprene monomer can be used. Examples of such emulsifiers include alkali metal salts of saturated or unsaturated fatty acids having 6 to 22 carbon atoms, alkali metal salts of rosin acids or disproportionated rosin acids, and alkali metal salts of formalin condensates of β-naphthalenesulfonic acid.

The molecular weight modifier used in the emulsion polymerization is not particularly limited, and a known molecular weight modifier generally used in the emulsion polymerization of a chloroprene monomer can be used. Examples of the molecular weight modifier include long-chain alkyl mercaptans such as n-dodecyl mercaptan, t-dodecyl mercaptan, and n-octyl mercaptan; xanthogen compounds such as diisopropylxanthogen disulfide and diethylxanthogen disulfide; iodoform; thiocarbonyl compounds such as benzyl 1-pyrrole carbodithioate (also known as benzyl 1-pyrrole dithiocarbamate), benzylphenyl carbodithioate, 1-benzyl-N,N-dimethyl-4-amino dithiobenzoate, 1-benzyl-4-methoxy dithiobenzoate, 1-phenylethylimidazole carbodithioate (also known as 1-phenylethylimidazole dithiocarbamate), benzyl-1-(2-pyrrolidinone) carbodithioate (also known as benzyl-1-(2-pyrrolidinone) dithiocarbamate), benzylphthalimidyl carbodithioate (also known as benzylphthalimidyl dithiocarbamate), 2-cyanoprop-2-yl-1-pyrrole carbodithioate (also known as 2-cyanoprop-2-yl-1-pyrrole dithiocarbamate), 2-cyanobut-2-yl-1-pyrrole carbodithioate (also known as 2-cyanobut-2-yl-1-pyrrole dithiocarbamate), benzyl-1-imidazole carbodithioate (also known as benzyl-1-imidazole dithiocarbamate), 2-cyanoprop-2-yl-N,N-dimethyl dithiocarbamate, benzyl-N,N-diethyl dithiocarbamate, cyanomethyl-1-(2-pyrrolidone) dithiocarbamate, 2-(ethoxycarbonylbenzyl) prop-2-yl-N,N-diethyl dithiocarbamate, 1-phenylethyl dithiobenzoate, 2-phenylprop-2-yl dithiobenzoate, 1-acetic acid-1-yl-ethyl dithiobenzoate, 1-(4-(methoxyphenyl)ethyl dithiobenzoate, benzyl dithioacetate, ethoxycarbonylmethyl dithioacetate, 2-(ethoxycarbonyl)prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl)-prop-2-yl dithiobenzoate, 3-vinylbenzyl dithiobenzoate, 4-vinylbenzyl dithiobenzoate, benzyldiethoxyphosphinyl dithioformate, t-butyl trithioperbenzoate, 2-phenylprop-2-yl-4-chloro dithiobenzoate, naphthalene-1-carboxyl acid-1-methyl-1-phenyl-ethyl ester, 4-cyano-4-methyl-4-thiobenzylsulfanyl butyric acid, dibenzyl tetrathioterephthalate, carboxymethyl dithiobenzoate, poly(ethylene oxide) having a dithiobenzoate end group, polyethylene oxide) having a 4-cyano-4-methyl-4-thiobenzylsulfanyl butyric acid end group, 2-[(2-phenylethanethioyl) sulfanyl] propanoic acid, 2-[(2-phenylethanethioyl) sulfanyl]succinic acid, 3,5-dimethyl-1H-pyrazole-1-carbodithioate potassium, cyanomethyl-3,5-dimethyl-1H-pyrazole-1-carbodithioate, cyanomethylmethyl-(phenyl) dithiocarbamate, benzyl-4-chloro dithiobenzoate, phenylmethyl-4-chloro dithiobenzoate, 4-nitrobenzyl-4-chloro dithiobenzoate, phenylprop-2-yl-4-chloro dithiobenzoate, 1-cyano-1-methylethyl-4-chloro dithiobenzoate, 3-chloro-2-butenyl-chloro dithiobenzoate, 2-chloro-2-butenyl dithiobenzoate, 3-chloro-2-butenyl-1H-pyrrole-1-dithiocarboxylic acid, 2-cyanobutan-2-yl-4-chloro-3,5-dimethyl-1H-pyrazole-1-carboxy dithioate, cyanomethylmethyl(phenyl) carbamodithioate, 2-cyano-2-propyldodecyl trithiocarbonate, dibenzyl trithiocarbonate, butylbenzyl trithiocarbonate, 2-[[(butylthio) thioxomethyl]

thio] propionic acid, 2-[[(dodecylthio) thioxomethyl] thio] propionic acid, 2-[[(butyithio) thioxomethyl] thio] succinic acid, 2-[[(dodecylthio) thioxomethyl] thio] succinic acid, 2-[[(dodecylthio) thioxomethyl] thio]-2-methly propionic acid, 2,2'-[carbonothioylbis(thio)] bis[2-methly propionic acid], 2-amino-1-methyl-2-oxoethylbutyl trithiocarbonate, benzyl-2-[(2-hydroxy ethyl) amino]-1-methyl-2-oxoethyl trithiocarbonate, 3-[[[(t-butyl) thio] thioxomethyl] thio] propionic acid, cyanomethyldodecyl trithiocarbonate, diethylaminobenzyl trithiocarbonate, and dibuthylaminobenzyl trithiocarbonate.

The polymerization temperature is not particularly limited, but is preferably 0 to 50° C., and more preferably 20 to 50° C. The final polymerization rate of chloroprene is not particularly limited, but is preferably in the range of 40 to 95%. In order to adjust the final polymerization rate, a polymerization inhibitor for terminating the polymerization reaction may be added to terminate the polymerization when the desired polymerization rate is reached.

The polymerization inhibitor is not particularly limited, and a known polymerization inhibitor generally used in emulsion polymerization of a chloroprene monomer can be used. Examples of such a polymerization inhibitor include thiodiphenylamine, 4-tert-butylcatechol, and 2,2-methylenebis-4-methyl-6-tert-butylphenol.

The unreacted chloroprene monomer can be removed, for example, by a steam stripping method. Thereafter, the pH is adjusted, and the chloroprene rubber is obtained through the steps of freeze coagulation, water washing, hot air drying, and the like in a conventional manner.

The chloroprene rubber is classified into a mercaptan-modified chloroprene rubber, a xanthogen-modified chloroprene rubber, a sulfur-modified chloroprene rubber, a dithiocarbonate-based chloroprene rubber, a trithiocarbonate-based chloroprene rubber, and a carbamate-based chloroprene rubber according to the type of the molecular weight modifier.

In the present embodiment, these various chloroprene rubbers can be used, and the properties of the obtained vulcanized rubber can be appropriately adjusted depending on the type of chloroprene used. For example, xanthogen-modified chloroprene rubber is excellent in mechanical properties such as tensile strength and elongation at break as compared with other modified types, and these mechanical properties can be improved by using xanthogen-modified chloroprene rubber. The sulfur-modified chloroprene rubber is excellent in adhesion properties to metal as compared with other modified types, and can improve adhesion to metal. Although not particularly limited, in order to improve the heat resistance of the vulcanized rubber, the blending ratio of the mercaptan-modified chloroprene rubber is preferably 40% by mass or more, more preferably 50% by mass or more, based on 100% by mass of the total chloroprene rubber. These chloroprene rubbers may be used alone or in combination of two or more, but it is preferable to use two or more in combination.

In addition to the chloroprene monomer and the unsaturated nitrile monomer, the chloroprene rubber may be copolymerized with a monomer copolymerizable with the chloroprene monomer, such as 2,3-dichloro-1,3-butadiene, 1-chloro-1,3-butadiene, styrene, isoprene, butadiene, acrylic acid, methacrylic acid, and esters thereof, as long as the object of the present invention is not impaired.

In order to adjust the content of the unsaturated nitrite monomer unit in the chloroprene rubber, the amounts of the chloroprene monomer and the unsaturated nitrite monomer added when the chloroprene rubber is polymerized may be adjusted, or the chloroprene rubber containing the unsaturated nitrile monomer unit and the chloroprene rubber not containing the unsaturated nitrite monomer unit may be mixed in any amount.

When the content of the unsaturated nitrile monomer unit is adjusted by mixing the chloroprene rubber containing the unsaturated nitrile monomer unit and the chloroprene rubber not containing the unsaturated nitrile monomer unit, it is preferable to mix the rubber A and the rubber B described below.

<Rubber A>

The rubber A is a chloroprene rubber containing an unsaturated nitrite monomer unit. Specifically, the rubber A is a chloroprene rubber containing 1 to 40% by mass of the unsaturated nitrite monomer unit, 40 to 99% by mass of the chloroprene monomer unit, and 0 to 20% by mass of another copolymerizable monomer unit. The production efficiency of the rubber A is improved, and the content of the unsaturated nitrile monomer unit in the chloroprene rubber is easily adjusted, by adjusting the content of the unsaturated nitrite monomer unit in the rubber A within this range. The method for polymerizing the rubber A is not particularly limited, and examples of the method include the methods exemplified in the method for polymerizing chloroprene rubber. The copolymerizable monomer is not particularly limited, and a monomer copolymerizable with the chloroprene monomer described above can be used.

The type of the chloroprene rubber of the rubber A is not particularly limited, but a xanthogen-modified chloroprene rubber is preferable from the viewpoint of improving mechanical properties such as tensile strength and elongation at break.

<Rubber B>

The rubber B is a chloroprene rubber containing no unsaturated nitrile monomer unit. Specifically, the rubber B is a chloroprene rubber containing 80 to 100% by mass of the chloroprene monomer unit and 0 to 20% by mass of another copolymerizable monomer unit. It is possible to dilute and adjust the content of the unsaturated nitrile monomer unit in the obtained chloroprene rubber by mixing the rubber A and the rubber B. The method for polymerizing the rubber B is not particularly limited, and examples of the method include the methods exemplified in the method for polymerizing chloroprene rubber. The copolymerizable monomer is not particularly limited, and a monomer copolymerizable with the chloroprene monomer described above can be used.

The type of the chloroprene rubber of the rubber B is not particularly limited, and examples of the chloroprene rubber of the rubber B include a mercaptan-modified chloroprene rubber, a xanthogen-modified chloroprene rubber, and a sulfur-modified chloroprene rubber. From the viewpoint of improving the properties of the obtained vulcanized rubber in a well-balanced manner, the rubber B is preferably a chloroprene rubber different from the rubber A. When the rubber A is the xanthogen-modified chloroprene rubber, the rubber B is preferably the mercaptan-modified chloroprene rubber or the sulfur-modified chloroprene rubber, and more preferably the mercaptan-modified chloroprene rubber.

In order to mix the rubber A and the rubber B, a conventionally known kneading apparatus such as a mixer, a Banbury mixer, a kneader mixer, or a two-roll mill may be used.

The chloroprene rubber preferably contains 1 to 49 parts by mass of the rubber A and 50 to 98 parts by mass of the rubber B, and more preferably contains 10 to 40 parts by mass of the rubber A and 60 to 90 parts by mass of the rubber B. The unsaturated nitrile monomer unit copolymerized in the rubber A is uniformly dispersed in the chloroprene rubber, and the oil resistance of the obtained vulcanized rubber is improved by adjusting the content ratio of the rubber A and the rubber B to this range.

<Non-Conjugated Diene Rubber>

The non-conjugated diene rubber is used to improve the ozone resistance of the resulting vulcanizate. The non-conjugated diene rubber is preferably at least one selected from the group consisting of ethylene-α-olefin copolymer rubber, ethylene-α-olefin-non-conjugated-polyene copolymer rubber, hydrogenated nitrile rubber, acrylic rubber, silicone rubber and butyl rubber.

As the ethylene-α-olefin copolymer rubber, an ethylene propylene rubber (EPM) obtained by copolymerizing ethylene and propylene at any ratio is preferable. Since EPM has no double bond in the main chain, it is particularly excellent in the effect of improving the ozone resistance of the vulcanizate. The ethylene-α-olefin-non-conjugated-polyene copolymer rubber is preferably ethylene-propylene-diene rubber (EPDM) in which a double bond is introduced into the main chain by adding a small amount of diene to ethylene and propylene. EPDM is slightly less effective in improving ozone resistance than EPM, but has a property of crosslinking with chloroprene rubber, and the mechanical strength of the resulting vulcanized rubber is improved.

The hydrogenated nitrile rubber is preferably a hydrogenated nitrile rubber (HNBR) obtained by copolymerizing acrylonitrile and butadiene at any ratio and hydrogenating butadiene monomer units. Among them, HNBR having a high hydrogenation rate is particularly excellent in the effect of improving ozone resistance.

The acrylic rubber is preferably a polyacrylate rubber (ACM) obtained by copolymerizing an acrylic ester as a main component with a chlorine-based monomer such as 2-chloroethyl vinyl ether or an epoxy-based monomer such as allyl glycidyl ether as a crosslinking monomer. Further, ethylene acrylate rubber (AEM) further copolymerized with ethylene is also preferable. Since ACM and AEM have no double bond in the main chain, they are particularly excellent in the effect of improving ozone resistance.

As the silicone rubber, dimethyl silicone rubber (MQ) in which all side chains are methyl groups, vinyl methyl silicone rubber (VMQ) in which a part of methyl groups is substituted with vinyl groups, phenyl methyl silicone rubber (PMQ) in which a part of methyl groups is substituted with phenyl groups, and the like can be used. Since MQ, VMQ and PMQ have no double bond in the main chain, they are particularly excellent in the effect of improving ozone resistance.

Examples of the butyl rubber include isobutylene-isoprene copolymer rubber (IIR) obtained by copolymerizing isobutylene and a small amount of isoprene, and halogenated IIR obtained by introducing a halogen such as chlorine or bromine into the IIR. IIR and halogenated IIR have moderate ozone resistance and have the property of crosslinking with chloroprene rubber, and the mechanical strength of the resulting vulcanized rubber is improved.

<Rubber Composition>

The rubber composition contains 50 to 99 parts by mass of a chloroprene rubber and 1 to 50 parts by mass of a non-conjugated diene rubber. The rubber composition preferably contains 60 to 99 parts by mass of the chloroprene rubber and 1 to 40 parts by mass of the non-conjugated diene rubber, and more preferably contains 70 to 95 parts by mass of the chloroprene rubber and 5 to 30 parts by mass of the non-conjugated diene rubber. If the content of the chloroprene rubber is less than 50 parts by mass, the oil resistance of the obtained vulcanized rubber is not improved, and if it exceeds 99 parts by mass, the ozone resistance is not improved.

The rubber composition preferably contains a vulcanizing agent. As the vulcanizing agent, at least one compound selected from the group consisting of 4,4'-dithiomorpholine, 2-(4'-morpholinodithio) benzothiazole, zinc oxide, sulfur and dipentamethylenethiuram tetrasulfide is preferably used.

The content of the vulcanizing agent is preferably 3 to 15 parts by mass with respect to 100 parts by mass of the total of the chloroprene rubber and the non-conjugated diene rubber in the rubber composition. The rubber composition can be sufficiently vulcanized, and the vulcanization rate can be adjusted to an appropriate range to suppress scorch of the rubber by setting the content of the vulcanizing agent to this range.

The rubber composition is obtained by kneading the chloroprene rubber, the non-conjugated diene rubber, and if necessary, other compounds such as the vulcanizing agent at a temperature equal to or lower than the vulcanization temperature. Examples of the apparatus for kneading the rubber composition include conventionally known mixers, a Banbury mixer, a kneader mixer, and a two-roll mill.

In the rubber composition, various additives used in conventional chloroprene rubbers can be blended so as to achieve target physical properties. Examples of the additives include fillers, reinforcing agents, plasticizers, processing aids, anti-aging agents, vulcanization accelerators, and the like.

Fillers and reinforcing agents include, for example, carbon black, silica, clay, talc, calcium carbonate, and the like. These can be added within a range not impairing heat resistance, and the content thereof is preferably within a range of 5 to 100 parts by mass with respect to 100 parts by mass of the total of the chloroprene rubber and the non-conjugated diene rubber in the rubber composition.

The plasticizer is not particularly limited as long as it is compatible with the chloroprene rubber. Examples of such plasticizers include vegetable oils such as rapeseed oil, phthalate-based plasticizers, di(2-ethylhexyl) sebacate (DOS), di(2-ethylhexyl) adipate (DOA), ester-based plasticizers, ether-ester-based plasticizers, thioether-based plasticizers, aromatic-based oils, naphthene-based oils, and the like. One or more of the plasticizer can be used according to the properties required for the rubber composition. The content of the plasticizer can be, for example, 5 to 50 parts by mass with respect to 100 parts by mass of the total of the chloroprene rubber and the non-conjugated diene rubber in the rubber composition.

Examples of the processing aid include fatty acids such as stearic acid, paraffin-based processing aids such as polyethylene, and fatty acid amides. The content of the processing aid can be, for example, 0.5 to 5 parts by mass with respect to 100 parts by mass of the total of the chloroprene rubber and the non-conjugated diene rubber in the rubber composition.

As the anti-aging agent, a general anti-aging agent such as an amine-based anti-aging agent, an imidazole-based anti-aging agent, a metal carbamate, a phenol-based anti-aging agent, or a wax can be used. Examples of the anti-aging agent having a large effect of improving heat resistance include amine-based anti-aging agents such as 4,4'-bis (α,α-dimethylbenzyl) diphenylamine and octylated diphenylamine. In particular, 4,4'-bis (α,α-dimethylbenzyl) diphenylamine is highly effective in improving heat resistance. These anti-aging agents may be used alone or in combination of two or more.

As the vulcanization accelerator, a thiourea-based vulcanization accelerator, a guanidine-based vulcanization accelerator, a thiuram-based vulcanization accelerator, or a thiazole-based vulcanization accelerator, which are generally used for vulcanization of chloroprene rubber, can be used, and the thiourea-based vulcanization accelerator is preferable. Examples of the thiourea-based vulcanization accelerator include ethylenethiourea, diethylthiourea, trimethylthiourea, triethylthiourea, and N,N'-diphenylthiourea, and trimethylthiourea and ethylenethiourea are particularly preferable. Also, accelerators such as 3-methylthiazolidine-2-thone, dimethylammoniumhydrogenisophtalate and 1,2-dimercapto-1,1,3,4-thiadiazole derivatives may be used. Two or more of these vulcanization accelerators may be used in combination. The content of these vulcanization accelerators is preferably 0.5 to 5 parts by mass with respect to 100 parts by mass of the total of the chloroprene rubber and the non-conjugated diene rubber in the rubber composition.

<Vulcanized Rubber>

A vulcanized rubber can be produced by molding a rubber composition into various desired shapes and then vulcanizing the molded rubber, and the vulcanized rubber may be used as a molded article. Further, the obtained vulcanized rubber may be processed into various shapes to obtain a molded article. The method of molding the rubber composition and the vulcanized rubber may be a method used in the ordinary rubber industry, and examples of the method include press molding, extrusion molding, calender molding, and the like.

The vulcanization temperature can be appropriately set depending on the formulation of the rubber composition or the type of the vulcanizing agent, and is usually preferably 140 to 220° C., and more preferably 150 to 180° C.

EXAMPLES

<Production of Chloroprene Rubber>

Production Example 1

<Chloroprene Rubber 1 (Content. of Acrylonitrile Monomer Unit: 1.2% by Mass)>

To a polymerization vessel having an internal volume of 3 liters and equipped with a heating cooling jacket and a stirrer, 37 parts by mass of chloroprene monomer, 4 parts by mass of acrylonitrile monomer, 0.5 parts by mass of diethylxanthogen disulfide, 200 parts by mass of pure water, 5.00 parts by mass of potassium rosinate (manufactured by Harima Chemicals, Inc.), 0.40 parts by mass of sodium hydroxide, and 2.0 parts by mass of sodium salt of β-naphthalenesulfonic acid-formalin condensation product (manufactured by Kao Corporation) were added. 0.1 parts by mass of potassium persulfate was added as a polymerization initiator, and emulsion polymerization was performed at a polymerization temperature of 40° C. under a nitrogen stream. The chloroprene monomer was continuously added by adding it in portions from 20 seconds after the start of polymerization, adjusting the flow rate of addition in portions with a solenoid valve based on the change in the amount of heat of the refrigerant for 10 seconds from the start of polymerization, and readjusting the flow rate every 10 seconds thereafter. When the polymerization rate based on the total amount of the chloroprene monomer and the acrylonitrile monomer reached 50%, phenothiazine as a polymerization terminator was added to terminate the polymerization. Thereafter, unreacted monomers in the reaction solution were removed under reduced pressure to obtain a chloroprene-acrylonitrile copolymer latex.

The polymerization rate of the chloroprene-acrylonitrile copolymer latex was calculated from the dry weight of the chloroprene-acrylonitrile copolymer latex dried in air. Specifically, it was calculated from the following formula:

Polymerization rate [%]={(total charge amount [g]×
solid content concentration [% by mass]/100)−
(evaporation residue [g])}/monomer charge
amount [g]×100    (1)

wherein the solid content concentration is a concentration (% by mass) of a solid content obtained by heating 2 g of sampled chloroprene-acrylonitrile copolymer latex at 130° C. to remove volatile components such as a solvent (water), volatile chemicals, and raw materials. The total charge amount is the total amount of the raw material, the reagent, and the solvent (water) charged into the polymerization vessel from the start of polymerization to a certain time. The evaporation residue refers to the mass of the raw material and the reagent which are not volatilized under the condition of 130° C. and remain as a solid content together with a polymer, among the raw material and the reagent charged from the start of polymerization until a certain time. The monomer charge amount is the total amount of the monomers initially charged in the polymerization vessel and the amount of the monomers added b from the start of polymerization to a certain time. The term "monomer" as used herein means the total amount of the chloroprene monomer and the acrylonitrile monomer.

The chloroprene-acrylonitrile copolymer latex obtained by the above-described method was adjusted to pH7.0 and freeze-coagulated on a metal plate cooled to −20° C. to be emulsion-broken. The obtained sheet was washed with water and dried at 130° C. for 15 minutes to obtain solid chloroprene rubber 1.

The number average molecular weight Mn, the weight average molecular weight Mw, and the molecular weight distribution (Mw/Mn) of the chloroprene rubber 1 were measured (in terms of standard polystyrene) using a high-performance GPC apparatus (TOSOH HLC-8320GPC: manufactured by Tosoh Corporation) after preparing a solution of the chloroprene rubber 1 in THF at a sample preparation concentration of 0.1% by mass. At this time, a TSK guard column HHR-H was used as a pre-column, and three columns of FISKgelGMHR-H were used as analytical columns, and the sample was eluted at a sample pump pressure of 8.0 to 9.5 MPa, a flow rate of 1 mL/min, and 40° C., and detected with a differential refractometer.

As a calibration curve showing the relationship between the outflow time and the molecular weight, a calibration curve prepared by measuring 9 points in total of standard polystyrene samples having known molecular weights described below was used.

Mw=8.42×10$^6$, 1.09×10$^6$, 7.06×10$^5$, 4.27×10$^5$, 1.90×10$^5$, 9.64×10$^4$, 3.79×10$^4$, 1.74×10$^4$, 2.63×10$^3$

The content of the unsaturated nitrile monomer unit of the chloroprene rubber 1 was calculated from the content of nitrogen atom in the chloroprene rubber 1. Specifically, the content of nitrogen atom in 100 mg of the chloroprene rubber 1 was measured using an elemental analyzer (SUMIGRAPH 220F, manufactured by Sumika. Chemical Analysis Service, Ltd.), and the content of the acrylonitrile monomer unit was calculated. The measurement conditions of the elemental analyzer were as follows. The temperatures of the electric furnace were 900° C. in the reaction furnace and 600° C. in the reduction furnace, the temperature of the column was 70° C., and the temperature of the detector was 100° C. and 0.2 ml/min of oxygen as a combustion gas and 80 ml/min of helium as a carrier gas were flowed. A calibration curve was prepared using aspartic acid (10.52%) having a known nitrogen content as a standard substance.

As a result, the number average molecular weight (Mn) was 138×10$^3$/mol, the weight average molecular weight (Mw) was 473×10$^3$/mol, and the molecular weight distribution (Mw/Mn) was 3.4. The content of the acrylonitrile monomer unit in the chloroprene 1 was 1.2% by mass. The content of the chloroprene monomer unit was 98.8% by mass.

Production Example 2

<Chloroprene Rubber 2 (Content of Acrylonitrile Monomer Unit: 5.2% by Mass)

To a polymerization vessel having an internal volume of 3 liters and equipped with a heating cooling jacket and a stirrer, 32 parts by mass of chloroprene monomer, 14 parts by mass of acrylonitrile monomer, 0.5 parts by mass of diethylxanthogen disulfide, 200 parts by mass of pure water, 5.00 parts by mass of potassium rosinate (manufactured by Mariana Chemicals, Inc.), 0.40 parts by mass of sodium hydroxide, and 2.0 parts by mass of sodium salt of β-naphthalenesulfonic acid-formalin condensation product (manufactured by Kao Corporation) were added. 0.1 parts by mass of potassium persulfate was added as a polymerization initiator, and polymerization was performed at a polymerization temperature of 40° C. under a nitrogen stream. The chloroprene monomer was continuously added by adding it in portions from 20 seconds after the start of polymerization, adjusting the flow rate of addition in portions with a solenoid valve based on the change in the amount of heat of the refrigerant for 10 seconds from the start of polymerization, and readjusting the flow rate every 10 seconds thereafter. When the polymerization rate based on the total amount of the chloroprene monomer and the acrylonitrile monomer reached 50%, phenothiazine as a polymerization terminator was added to terminate the polymerization. Thereafter, unreacted monomers in the reaction solution were removed under reduced pressure to obtain a chloroprene-acrylonitrile copolymer latex.

The obtained chloroprene-acrylonitrile copolymer latex was freeze-coagulated, washed with water and dried in the same manner as in Production Example 1 to obtain a solid chloroprene rubber 2.

As a result of analyzing the chloroprene rubber 2 by the same method as in Production Example 1, the number average molecular weight (Mn) was 130×10$^3$/mol, the weight average molecular weight (Mw) was 442×10$^3$/mol, and the molecular weight distribution (Mw/Mn) was 3.4. The content of the acrylonitrile monomer unit was 5.2% by mass. The content of the chloroprene monomer unit was 94.8% by mass.

Production Example 3

<Chloroprene Rubber 3 (Content of Acrylonitrile Monomer Unit: 9.9% by Mass)

To a polymerization vessel having an internal volume of 3 liters and equipped with a heating cooling jacket and a stirrer, 24 parts by mass of chloroprene monomer, 24 parts by mass of acrylonitrile monomer, 0.5 parts by mass of diethylxanthogen disulfide, 200 parts by mass of pure water, 5.00 parts by mass of potassium rosinate (manufactured by Harima Chemicals, Inc.), 0.40 parts by mass of sodium hydroxide, and 2.0 parts by mass of sodium salt of β-naphthalenesulfonic acid-formalin condensation product (manufactured by Kao Corporation) were added. 0.1 parts by mass of potassium persulfate was added as a polymerization initiator, and polymerization was performed at a polymerization temperature of 40° C. under a nitrogen stream. The chloroprene monomer was continuously added by adding it in portions from 20 seconds after the start of polymerization, adjusting the flow rate of addition in portions with a solenoid valve based on the change in the amount of heat of the refrigerant for 10 seconds from the start of polymerization, and readjusting the flow rate every 10 seconds thereafter. When the polymerization rate based on the total amount of the chloroprene monomer and the acrylonitrile monomer reached 50%, phenothiazine as a polymerization terminator was added to terminate the polymerization. Thereafter, unreacted monomers in the reaction solution were removed under reduced pressure to obtain a chloroprene-acrylonitrile copolymer latex.

The obtained chloroprene acrylonitrile copolymer latex was freeze-coagulated, washed with water and dried in the same manner as in Production Example 1 to obtain a solid chloroprene rubber 3.

As a result of analyzing the chloroprene rubber 3 by the same method as in Production Example 1, the number average molecular weight (Mn) was 139×10$^3$/mol, the weight average molecular weight (Mw) was 480×10$^3$/mol, and the molecular weight distribution (Mw/Mn) was 3.5. The content of the acrylonitrile monomer unit was 9.9% by mass. The content of the chloroprene monomer unit was 90.1% by mass.

Production Example 4

<Chloroprene Rubber 4 (Content of Acrylonitrile Monomer Unit: 19.7% by Mass)

To a polymerization vessel having an internal volume of 3 liters and equipped with a heating cooling jacket and a stirrer, 10 parts by mass of chloroprene monomer, 40 parts by mass of acrylonitrile monomer, 0.5 parts by mass of diethyl xanthogen disulfide, 200 parts by mass of pure water, 5.00 parts by mass of potassium rosinate (manufactured by Harima Chemicals, Inc.), 0.40 parts by mass of sodium hydroxide, and 2.0 parts by mass of sodium salt of β-naphthalenesulfonic acid-formalin condensation product (manufactured by Kao Corporation) were added. 0.1 parts by mass of potassium persulfate was added as a polymerization initiator, and polymerization was performed at a polymerization temperature of 40° C. under a nitrogen stream. The chloroprene monomer was continuously added by adding it in portions from 20 seconds after the start of polymerization, adjusting the flow rate of addition in portions with a solenoid valve based on the change in the amount of heat of the refrigerant for 10 seconds from the start of polymerization, and readjusting the flow rate every 10 seconds thereafter. When the polymerization rate based on the total amount of the chloroprene monomer and the acrylonitrile monomer reached 50%, phenothiazine as a polymerization terminator was added to terminate the polymerization. Thereafter, unreacted monomers in the reaction solution were removed under reduced pressure to obtain a chloroprene-acrylonitrile copolymer latex.

The obtained chloroprene-acrylonitrile copolymer latex was freeze-coagulated, washed with water and dried in the same manner as in Production Example 1 to obtain a solid chloroprene rubber 4.

As a result of analyzing the chloroprene rubber 4 by the same method as in Production Example 1, the number average molecular weight (Mn) was 135×10³/mol, the weight average molecular weight (Mw) was 457×10³/mol, and the molecular weight distribution (Mw/Mn) was 3.4. The content of the acrylonitrile monomer unit was 19.7% by mass. The content of the chloroprene monomer unit was 80.3% by mass.

Production Example 5

<Chloroprene Rubber 5 (Content of Acrylonitrile Monomer Unit: 39.6 by Mass)

To a polymerization vessel having an internal volume of 3 liters and equipped with a heating cooling jacket and a stirrer, 3 parts by mass of chloroprene monomer, 59 parts by mass of acrylonitrile monomer, 0.5 parts by mass of diethylxanthogen disulfide, 200 parts by mass of pure water, 5.00 parts by mass of potassium rosinate (manufactured by Harima Chemicals, Inc.), 0.40 parts by mass of sodium hydroxide, and 2.0 parts by mass of sodium salt of β-naphthalenesulfonic acid formalin condensation product (manufactured by Kao Corporation) were added. 0.1 parts by mass of potassium persulfate was added as a polymerization initiator, and polymerization was performed at a polymerization temperature of 40° C. under a nitrogen stream. The chloroprene monomer was continuously added by adding it in portions from 20 seconds after the start of polymerization, adjusting the flow rate of addition in portions with a solenoid valve based on the change in the amount of heat of the refrigerant for 10 seconds from the start of polymerization, and readjusting the flow rate every 10 seconds thereafter. When the polymerization rate based on the total amount of the chloroprene monomer and the acrylonitrile monomer reached 50%, phenothiazine as a polymerization terminator was added to terminate the polymerization. Thereafter, unreacted monomers in the reaction solution were removed under reduced pressure to obtain a chloroprene-acrylonitrile copolymer latex.

The obtained chloroprene-acrylonitrile copolymer latex was freeze-coagulated, washed with water and dried in the same manner as in Production Example 1 to obtain a solid chloroprene rubber 4.

As a result of analyzing the chloroprene rubber 5 by the same method as in Production Example 1, the number average molecular weight (Mn) was 137×10³/mol, the weight average molecular weight (Mw) was 465×10³/mol, and the molecular weight distribution (Mw/Mn) was 3.4. The content of the acrylonitrile monomer unit was 39.6% by mass. The content of the chloroprene monomer unit was 60.4% by mass.

<Production of Vulcanized Rubber>

Chloroprene rubbers 1 to 5 obtained by the above method and the compounds shown in Tables 1 and 2 below were mixed using a 8 inch roll to prepare rubber compositions. The obtained rubber compositions were fractionated and subjected to press vulcanization at 160° C. for 20 minutes to prepare a vulcanized rubber (rubber sheet) for evaluation having a sheet length of 200 mm, a sheet width of 15 mm, and a thickness of 2.1 mm.

The compounds used in Tables 1 and 2 are as follows.

Mercaptan-modified chloroprene rubber: manufactured by Denka Co., Ltd. (raw rubber Mooney viscosity ML 1+4 (100° C.)=80)

Xanthogen-modified chloroprene rubber: manufactured by Denka Co., Ltd. (raw rubber Mooney viscosity ML 1+4 (100° C.)=70)

Sulfur-modified chloroprene rubber: manufactured by Denka Co., Ltd. (raw rubber Mooney viscosity ML 1+4 (100° C.)=40)

EPDM: ESPRENE® 505A manufactured by Sumitomo Chemical Co., Ltd. (ethylene content 50%, diene content 9.5%)

Hydrogenated nitrile rubber: Zetpol® 2010 manufactured by Zeon Corporation (acrylonitrile content 36.2%, Mooney viscosity 85)

Silicone rubber: RBB-6640-40 BASE manufactured by Dow Corning Toray Co., Ltd.

Acrylic rubber: Nipol® AR12 manufactured by Zeon Corporation (Mooney viscosity 33)

Butyl rubber: brominated butyl rubber, EXXON® BUROMOBUTYL (Exxon bromobutyl 2255) manufactured by Exxon Mobil Chemical Vulcanizing agent A: Valknock® R (4,4'-dithiomorpholine) manufactured by Ouchi Shinko Chemical Industrial Co., Ltd.

Vulcanizing agent B: Nocceler® MDB (2-(4'-morpholinodithio) benzothiazole) manufactured by Ouchi Shinko Chemical Industrial Co., Ltd.

Vulcanizing agent C: two types of zinc oxide manufactured by Sakai Chemical Industry Co., Ltd.

Vulcanization accelerator: ACCEL® 22-S (ethylenethiourea) manufactured by Kawaguchi Chemical Industry Co., Ltd.

Lubricant/Processing Aid: stearic acid 505 manufactured by New Japan Chemical Co., Ltd.

Anti-aging agent A: Nocrac® 6C (N-phenyl-N'-(1,3-dimethylbutyl)-p-phenylenediamine) manufactured by Ouchi Shinko Chemical Industrial Co., Ltd.

Anti-aging agent B: Nocrac® CD (4,4'-bis(α,α-dimethylbenzyl) diphenylamine) manufactured by Ouchi Shinko Chemical Industrial Co., Ltd.

Carbon black: Seast SO (FEF carbon) manufactured by Tokai Carbon Co., Ltd.

Plasticizer: dioctyl sebacate manufactured by Daihachi Chemical Industry Co., Ltd.

Magnesium oxide: Kyowamag® 150 manufactured by Kyowa Chemical Industry Co., Ltd.

The obtained vulcanized rubber (rubber sheet) was evaluated as follows. The evaluation results are shown in Tables 1 and 2.

<Oil Resistance>

A test piece was produced based on JIS K 6250 an oil resistance test (test conditions: 100° C.×72 hours) was performed using IRM 903 oil based on JIS K 6258, and a volume change rate (ΔV) was measured. A sample having ΔV of less than 60 was evaluated as particularly good (⊚), a sample having ΔV of 60 or more and less than 100 was evaluated as good (○), and a sample having ΔV of 100 or more was evaluated as poor (×).

<Cold Resistance>

A test piece was produced based on JIS K 6250, a low-temperature torsion test (Gehman torsion test) was performed based on JIS K 6261, and a temperature T10 corresponding to a torsion angle was measured from the torsion angle at 23±2° C. and the torsion angle corresponding to a modulus of 10 times the torsion angle value. A sample having a T10 of less than −30° C. was evaluated as particularly good (⊚), a sample having a T10 of 30° C. or more and less than −15° C. was evaluated as good (○), and a sample having a T10 of −15° C. or more was evaluated as poor (×).

<Ozone Resistance>

A test piece was produced based on JIS K 6250, a dynamic ozone degradation test was performed based on HS K 6259-1, and a time until a crack was generated on a surface or a side surface of the test piece when the test piece was continuously exposed to ozone under conditions of a test temperature of 40° C., an ozone concentration of 50 pphm, and an elongation of 20% was measured. A sample having the time until the occurrence of cracks of 240 hours or more was evaluated as particularly good (◎), a sample having the time of 72 hours or more and less than 240 hours was evaluated as good (○), and a sample having the time of less than 72 hours was evaluated as poor (×).

TABLE 1

| | | | | Example | | | | | | | | | | | |
|---|---|---|---|---|---|---|---|---|---|---|---|---|---|---|---|
| | | | Unit | 1 | 2 | 3 | 4 | 5 | 6 | 7 | 8 | 9 | 10 | 11 | 12 |
| Formulation | Chloroprene rubber (rubber A) | Chloroprene rubber 1 | Parts by mass | 99 | 70 | 50 | 1 | 10 | 20 | 40 | | | | | |
| | | Chloroprene rubber 2 | Parts by mass | | | | | | | | 20 | | | | |
| | | Chloroprene rubber 3 | Parts by mass | | | | | | | | | 20 | | | |
| | | Chloroprene rubber 4 | Parts by mass | | | | | | | | | | 20 | | |
| | | Chloroprene rubber 5 | Parts by mass | | | | | | | | | | | 20 | 49 |
| | Chloroprene rubber (rubber B) | Mercaptan-modified chloroprene rubber | Parts by mass | | | | 89 | 80 | 70 | 50 | 70 | 70 | 70 | 70 | 50 |
| | | Xanthogen-modified chloroprene rubber | Parts by mass | | | | | | | | | | | | |
| | | Sulfur-modified chloroprene rubber | Parts by mass | | | | | | | | | | | | |
| | Total amount of chloroprene rubber | | Parts by mass | 99 | 70 | 50 | 90 | 90 | 90 | 90 | 90 | 90 | 90 | 90 | 99 |
| | Content of unsaturated nitrile monomer unit in chloroprene rubber | | % by mass | 1.20 | 1.20 | 1.20 | 0.01 | 0.13 | 0.27 | 0.53 | 1.16 | 2.20 | 4.38 | 8.80 | 19.6 |
| | Non-conjugated diene rubber | EPDM | Parts by mass | 1 | 30 | 50 | 10 | 10 | 10 | 10 | 10 | 10 | 10 | 10 | 1 |
| | | Hydrogenated nitrile rubber | Parts by mass | | | | | | | | | | | | |
| | | Silicone rubber | Parts by mass | | | | | | | | | | | | |
| | | Acrylic rubber | Parts by mass | | | | | | | | | | | | |
| | | Butyl rubber | Parts by mass | | | | | | | | | | | | |
| Formulation | Vulcanizing agent A | Valknock R | Parts by mass | 1 | 1 | 1 | 1 | 1 | 1 | 1 | 1 | 1 | 1 | 1 | 1 |
| | Vulcanizing agent B | Nocceler MDB | Parts by mass | | | | | | | | | | | | |
| | Vulcanizing agent C | Two types of zinc oxide | Parts by mass | 5 | 5 | 5 | 5 | 5 | 5 | 5 | 5 | 5 | 5 | 5 | 5 |
| | Vulcanization accelerator | ACCEL 22-S | Parts by mass | 0.5 | 0.5 | 0.5 | 0.5 | 0.5 | 0.5 | 0.5 | 0.5 | 0.5 | 0.5 | 0.5 | 0.5 |
| | Lubricant/Processing Aid | Stearic acid | Parts by mass | 0.5 | 0.5 | 0.5 | 0.5 | 0.5 | 0.5 | 0.5 | 0.5 | 0.5 | 0.5 | 0.5 | 0.5 |
| | Anti-aging agent A | Nocrac 6C | Parts by mass | 1 | 1 | 1 | 1 | 1 | 1 | 1 | 1 | 1 | 1 | 1 | 1 |
| | Anti-aging agent B | Nocrac CD | Parts by mass | 1 | 1 | 1 | 1 | 1 | 1 | 1 | 1 | 1 | 1 | 1 | 1 |
| | Carbon black | Seast SO | Parts by mass | 50 | 50 | 50 | 50 | 50 | 50 | 50 | 50 | 50 | 50 | 50 | 50 |
| | Plasticizer | Dioctyl sebacate | Parts by mass | 10 | 10 | 10 | 10 | 10 | 10 | 10 | 10 | 10 | 10 | 10 | 10 |
| | Magnesium oxide | Kyowamag 150 | Parts by mass | 4 | 4 | 4 | 4 | 4 | 4 | 4 | 4 | 4 | 4 | 4 | 4 |
| Evaluation | | Oil resistance | | ◎ | ○ | ○ | ○ | ○ | ○ | ○ | ○ | ◎ | ◎ | ◎ | ◎ |
| | | Cold resistance | | ◎ | ◎ | ◎ | ◎ | ◎ | ◎ | ◎ | ◎ | ◎ | ○ | ○ | ○ |
| | | Ozone resistance | | ○ | ◎ | ◎ | ◎ | ◎ | ◎ | ◎ | ◎ | ◎ | ◎ | ◎ | ○ |

TABLE 2

| | | | Unit | Example 13 | 14 | 15 | 16 | 17 | 18 | 19 | 20 | 21 | 22 | 23 |
|---|---|---|---|---|---|---|---|---|---|---|---|---|---|---|
| Formulation | Chloroprene rubber (rubber A) | Chloroprene rubber 1 | Parts by mass | | | | | 10 | 10 | | | | | |
| | | Chloroprene rubber 2 | Parts by mass | | | | | | | | | | | |
| | | Chloroprene rubber 3 | Parts by mass | 20 | 20 | 20 | 20 | | | 20 | 20 | 20 | 20 | 20 |
| | | Chloroprene rubber 4 | Parts by mass | | | | | | | | | | | |
| | | Chloroprene rubber 5 | Parts by mass | | | | | | | | | | | |
| | Chloroprene rubber (rubber B) | Mercaptan-modified chloroprene rubber | Parts by mass | 79 | 75 | 60 | 50 | | | 70 | 70 | 70 | 70 | 70 |
| | | Xanthogen-modified chloroprene rubber | Parts by mass | | | | | 80 | | | | | | |
| | | Sulfur-modified chloroprene rubber | Parts by mass | | | | | | 80 | | | | | |
| | Total amount of chloroprene rubber | | Parts by mass | 99 | 95 | 80 | 70 | 90 | 90 | 90 | 90 | 90 | 90 | 90 |
| | Content of unsaturated nitrile monomer unit in chloroprene rubber | | % by mass | 2.00 | 2.08 | 2.48 | 2.83 | 0.13 | 0.13 | 2.20 | 2.20 | 2.20 | 2.20 | 2.20 |
| | Non-conjugated diene rubber | EPDM | Parts by mass | 1 | 5 | 20 | 30 | 10 | 10 | | | | | 10 |
| | | Hydrogenated nitrile rubber | Parts by mass | | | | | | | 10 | | | | |
| | | Silicone rubber | Parts by mass | | | | | | | | 10 | | | |
| | | Acrylic rubber | Parts by mass | | | | | | | | | 10 | | |
| | | Butyl rubber | Parts by mass | | | | | | | | | | 10 | |
| Formulation | Vulcanizing agent A | Valknock R | Parts by mass | 1 | 1 | 1 | 1 | 1 | 1 | 1 | 1 | 1 | 1 | |
| | Vulcanizing agent B | Nocceler MDB | Parts by mass | | | | | | | | | | | 1 |
| | Vulcanizing agent C | Two types of zinc oxide | Parts by mass | 5 | 5 | 5 | 5 | 5 | 5 | 5 | 5 | 5 | 5 | 10 |
| | Vulcanization accelerator | ACCEL 22-S | Parts by mass | 0.5 | 0.5 | 0.5 | 0.5 | 0.5 | 0.5 | 0.5 | 0.5 | 0.5 | 0.5 | 4 |
| | Lubricant/Processing Aid | Stearic acid | Parts by mass | 0.5 | 0.5 | 0.5 | 0.5 | 0.5 | 0.5 | 0.5 | 0.5 | 0.5 | 0.5 | 5 |
| | Anti-aging agent A | Nocrac 6C | Parts by mass | 1 | 1 | 1 | 1 | 1 | 1 | 1 | 1 | 1 | 1 | 0.5 |
| | Anti-aging agent B | Nocrac CD | Parts by mass | 1 | 1 | 1 | 1 | 1 | 1 | 1 | 1 | 1 | 1 | 0.5 |
| | Carbon black | Seast SO | Parts by mass | 50 | 50 | 50 | 50 | 50 | 50 | 50 | 50 | 50 | 50 | 1 |
| | Plasticizer | Dioctyl sebacate | Parts by mass | 10 | 10 | 10 | 10 | 10 | 10 | 10 | 10 | 10 | 10 | 1 |
| | Magnesium oxide | Kyowamag 150 | Parts by mass | 4 | 4 | 4 | 4 | 4 | 4 | 4 | 4 | 4 | 4 | 50 |
| Evaluation | | Oil resistance | | ◎ | ◎ | ○ | ○ | ○ | ○ | ◎ | ◎ | ◎ | ◎ | ◎ |
| | | Cold resistance | | ◎ | ◎ | ○ | ○ | ◎ | ◎ | ◎ | ◎ | ◎ | ◎ | ◎ |
| | | Ozone resistance | | ○ | ○ | ◎ | ◎ | ◎ | ◎ | ◎ | ◎ | ◎ | ◎ | ◎ |

From the results shown in Tables 1 and 2, it was found that a vulcanized rubber excellent in oil resistance, cold resistance and ozone resistance can be obtained by using a rubber composition containing 50 to 99 parts by mass of a chloroprene rubber containing 0.01 to 20% by mass of an unsaturated nitrile monomer unit and 1 to 50 parts by mass of a non-conjugated diene rubber. Since the vulcanized rubber has these properties, it can be suitably used as a molded article such as a rubber member for an automobile, a hose, and a rubber molded article.

The invention claimed is:

1. A rubber composition comprising:
50 to 99 parts by mass of a chloroprene rubber comprising 0.01 to 20% by mass of an unsaturated nitrile monomer unit; and
1 to 50 parts by mass of a non-conjugated diene rubber, wherein the chloroprene rubber comprises 1 to 49 parts by mass of a rubber A containing the unsaturated nitrile monomer unit and 50 to 98 parts by mass of a rubber B containing no unsaturated nitrile monomer unit.

2. The rubber composition according to claim 1, wherein the rubber A comprises 1 to 40% by mass of an unsaturated nitrile monomer unit, 40 to 99% by mass of a chloroprene monomer unit, and 0 to 20% by mass of another copolymerizable monomer unit, and
wherein the rubber B comprises 80 to 100% by mass of a chloroprene monomer unit and 0 to 20% by mass of another copolymerizable monomer unit.

3. The rubber composition according to claim 1, wherein the non-conjugated diene rubber is at least one selected from the group consisting of an ethylene-α-olefin copolymer rubber, an ethylene-α-olefin-non-conjugated-polyene copolymer rubber, a hydrogenated nitrile rubber, an acrylic rubber, a silicone rubber, and a butyl rubber.

4. A vulcanized rubber of the rubber composition according to claim 1.

5. A molded article prepared from the vulcanized rubber according to claim 4.

* * * * *